United States Patent
Laflaquière et al.

(10) Patent No.: US 11,852,727 B2
(45) Date of Patent: Dec. 26, 2023

(54) TIME-OF-FLIGHT SENSING USING AN ADDRESSABLE ARRAY OF EMITTERS

(71) Applicant: Apple Inc., Cupertino, CA (US)

(72) Inventors: Arnaud Laflaquière, Singapore (SG); Marc Drader, Waterloo (CA)

(73) Assignee: APPLE INC., Cupertino, CA (US)

( * ) Notice: Subject to any disclaimer, the term of this patent is extended or adjusted under 35 U.S.C. 154(b) by 826 days.

(21) Appl. No.: 16/769,346

(22) PCT Filed: Dec. 18, 2017

(86) PCT No.: PCT/US2017/066919
§ 371 (c)(1),
(2) Date: Jun. 3, 2020

(87) PCT Pub. No.: WO2019/125349
PCT Pub. Date: Jun. 27, 2019

(65) Prior Publication Data
US 2020/0309955 A1 Oct. 1, 2020

(51) Int. Cl.
*G01S 17/89* (2020.01)
*G01S 17/894* (2020.01)
(Continued)

(52) U.S. Cl.
CPC ............. *G01S 17/89* (2013.01); *G01S 7/483* (2013.01); *G01S 7/4815* (2013.01);
(Continued)

(58) Field of Classification Search
CPC .................................. G01S 17/89; G01S 17/10
See application file for complete search history.

(56) References Cited

U.S. PATENT DOCUMENTS

| 4,623,237 A | 11/1986 | Kaneda et al. |
| 4,757,200 A | 7/1988 | Shepherd |

(Continued)

FOREIGN PATENT DOCUMENTS

| CA | 2605339 C | 10/1994 |
| CN | 201054040 Y | 4/2008 |

(Continued)

OTHER PUBLICATIONS

Charbon et al., "SPAD-Based Sensors", TOF Range-Imaging Cameras, Springer-Verlag, pp. 11-38, year 2013.
(Continued)

*Primary Examiner* — Jerry T Jean Baptiste
(74) *Attorney, Agent, or Firm* — KLIGLER & ASSOCIATES PATENT ATTORNEYS LTD

(57) ABSTRACT

Optical sensing apparatus (20) includes an array (28) of emitters (50), which emit pulses of optical radiation at different, respective times in response to a control input applied to the array. A receiver (26) includes a plurality of detectors (40), which output signals indicative of times of arrival of photons at the detectors. Optics (30, 32) project the optical radiation from the emitters onto respective locations in a scene and image the respective locations onto corresponding pixels of the receiver. A controller (44) controls the emitters to emit the output pulses in a predefined spatio-temporal sequence, and collects and processes the signals output by corresponding pixels in synchronization with the spatio-temporal sequence so as to measure respective times of flight of the pulses to and from the respective locations in the scene.

18 Claims, 4 Drawing Sheets

(51) Int. Cl.
  *G01S 7/481*  (2006.01)
  *G01S 17/10*  (2020.01)
  *G01S 7/483*  (2006.01)
  *G01S 7/4865*  (2020.01)
(52) U.S. Cl.
  CPC ............ *G01S 7/4865* (2013.01); *G01S 17/10* (2013.01); *G01S 17/894* (2020.01)

(56) References Cited

U.S. PATENT DOCUMENTS

| | | |
|---|---|---|
| 5,164,823 A | 11/1992 | Keeler |
| 5,270,780 A | 12/1993 | Moran et al. |
| 5,373,148 A | 12/1994 | Dvorkis et al. |
| 5,699,149 A | 12/1997 | Kuroda et al. |
| 6,301,003 B1 | 10/2001 | Shirai et al. |
| 6,384,903 B1 | 5/2002 | Fuller |
| 6,710,859 B2 | 3/2004 | Shirai et al. |
| 7,126,218 B1 | 10/2006 | Darveaux et al. |
| 7,193,690 B2 | 3/2007 | Ossig et al. |
| 7,303,005 B2 | 12/2007 | Reis et al. |
| 7,405,812 B1 | 7/2008 | Bamji |
| 7,508,496 B2 | 3/2009 | Mettenleiter et al. |
| 7,800,067 B1 | 9/2010 | Rajavel et al. |
| 7,800,739 B2 | 9/2010 | Rohner et al. |
| 7,812,301 B2 | 10/2010 | Oike et al. |
| 7,969,558 B2 | 6/2011 | Hall |
| 8,193,482 B2 | 6/2012 | Itsler |
| 8,259,293 B2 | 9/2012 | Andreou |
| 8,275,270 B2 | 9/2012 | Shushakov et al. |
| 8,279,418 B2 | 10/2012 | Yee et al. |
| 8,355,117 B2 | 1/2013 | Niclass |
| 8,405,020 B2 | 3/2013 | Menge |
| 8,594,425 B2 | 11/2013 | Gurman et al. |
| 8,675,181 B2 | 3/2014 | Hall |
| 8,736,818 B2 | 5/2014 | Weimer et al. |
| 8,766,164 B2 | 7/2014 | Sanfilippo et al. |
| 8,766,808 B2 | 7/2014 | Hogasten |
| 8,891,068 B2 | 11/2014 | Eisele et al. |
| 8,910,068 B2 | 11/2014 | Eisele et al. |
| 8,925,814 B1 | 1/2015 | Schneider et al. |
| 8,963,069 B2 | 2/2015 | Drader et al. |
| 9,002,511 B1 | 4/2015 | Hickerson et al. |
| 9,024,246 B2 | 5/2015 | Jiang et al. |
| 9,052,356 B2 | 6/2015 | Chu et al. |
| 9,076,707 B2 | 7/2015 | Harmon |
| 9,016,849 B2 | 8/2015 | Duggal et al. |
| 9,267,787 B2 | 2/2016 | Shpunt et al. |
| 9,335,220 B2 | 5/2016 | Shpunt et al. |
| 9,354,332 B2 | 5/2016 | Zwaans et al. |
| 9,386,299 B2 | 7/2016 | Shpunt et al. |
| 9,465,111 B2 | 10/2016 | Wilks et al. |
| 9,516,248 B2 | 12/2016 | Cohen et al. |
| 9,709,678 B2 | 7/2017 | Matsuura |
| 9,736,459 B2 | 8/2017 | Mor et al. |
| 9,739,881 B1 | 8/2017 | Pavek et al. |
| 9,761,049 B2 | 9/2017 | Naegle et al. |
| 9,786,701 B2 | 10/2017 | Mellot et al. |
| 9,810,777 B2 | 11/2017 | Williams et al. |
| 9,874,635 B1 | 1/2018 | Eichenholz et al. |
| 10,063,844 B2 | 8/2018 | Adam et al. |
| 10,067,224 B2 | 9/2018 | Moore et al. |
| 10,132,616 B2 | 11/2018 | Wang |
| 10,215,857 B2 | 2/2019 | Oggier et al. |
| 10,269,104 B2 | 4/2019 | Hannuksela et al. |
| 10,386,487 B1 | 8/2019 | Wilton et al. |
| 10,424,683 B1 | 9/2019 | Do Valle et al. |
| 10,613,203 B1 | 4/2020 | Rekow et al. |
| 10,782,393 B2 | 9/2020 | Dussan et al. |
| 2001/0020673 A1 | 9/2001 | Zappa et al. |
| 2002/0071126 A1 | 6/2002 | Shirai et al. |
| 2002/0131035 A1 | 9/2002 | Watanabe et al. |
| 2002/0154054 A1 | 10/2002 | Small |
| 2002/0186362 A1 | 12/2002 | Shirai et al. |
| 2004/0051859 A1 | 3/2004 | Flockencier |
| 2004/0135992 A1 | 7/2004 | Munro |
| 2004/0212863 A1 | 10/2004 | Schanz et al. |
| 2006/0044546 A1 | 3/2006 | Lewin et al. |
| 2006/0106317 A1 | 5/2006 | McConnell et al. |
| 2006/0176469 A1 | 8/2006 | O'Connor et al. |
| 2007/0145136 A1 | 6/2007 | Wiklof et al. |
| 2008/0231498 A1 | 9/2008 | Menzer et al. |
| 2009/0009747 A1 | 1/2009 | Wolf et al. |
| 2009/0262760 A1 | 10/2009 | Krupkin et al. |
| 2009/0273770 A1 | 11/2009 | Bauhahn et al. |
| 2009/0275841 A1 | 11/2009 | Melendez et al. |
| 2010/0019128 A1 | 1/2010 | Itzler |
| 2010/0045965 A1 | 2/2010 | Meneely |
| 2010/0096459 A1 | 4/2010 | Gurevich |
| 2010/0121577 A1 | 5/2010 | Zhang et al. |
| 2010/0250189 A1 | 9/2010 | Brown |
| 2010/0286516 A1 | 11/2010 | Fan et al. |
| 2010/0309288 A1 | 12/2010 | Stettner et al. |
| 2011/0006190 A1 | 1/2011 | Alameh et al. |
| 2011/0128524 A1 | 6/2011 | Vert et al. |
| 2011/0181864 A1 | 7/2011 | Schmitt et al. |
| 2011/0279366 A1 | 11/2011 | Lohbihler |
| 2012/0038904 A1 | 2/2012 | Fossum et al. |
| 2012/0075615 A1 | 3/2012 | Niclass et al. |
| 2012/0132636 A1 | 5/2012 | Moore |
| 2012/0153120 A1 | 6/2012 | Baxter |
| 2012/0154542 A1 | 6/2012 | Katz et al. |
| 2012/0176476 A1 | 7/2012 | Schmidt et al. |
| 2012/0249998 A1 | 10/2012 | Eisele et al. |
| 2012/0287242 A1 | 11/2012 | Gilboa et al. |
| 2012/0294422 A1 | 11/2012 | Cheung et al. |
| 2013/0015331 A1 | 1/2013 | Birk et al. |
| 2013/0079639 A1 | 3/2013 | Hoctor et al. |
| 2013/0092846 A1 | 4/2013 | Henning et al. |
| 2013/0107016 A1 | 5/2013 | Federspiel |
| 2013/0208258 A1 | 8/2013 | Eisele et al. |
| 2013/0236171 A1 | 9/2013 | Saunders |
| 2013/0258099 A1 | 10/2013 | Ovsiannikov et al. |
| 2013/0278917 A1 | 10/2013 | Korekado et al. |
| 2013/0300838 A1 | 11/2013 | Borowski |
| 2013/0342835 A1 | 12/2013 | Blacksberg |
| 2014/0027606 A1 | 1/2014 | Raynor et al. |
| 2014/0071433 A1 | 3/2014 | Eisele et al. |
| 2014/0077086 A1 | 3/2014 | Batkilin et al. |
| 2014/0078491 A1 | 3/2014 | Eisele et al. |
| 2014/0162714 A1 | 6/2014 | Kim et al. |
| 2014/0191115 A1 | 7/2014 | Webster et al. |
| 2014/0198198 A1 | 7/2014 | Geissbuehler et al. |
| 2014/0231630 A1 | 8/2014 | Rae et al. |
| 2014/0240317 A1 | 8/2014 | Go et al. |
| 2014/0240691 A1 | 8/2014 | Mheen et al. |
| 2014/0268127 A1 | 9/2014 | Day |
| 2014/0300907 A1 | 10/2014 | Kimmel |
| 2014/0321862 A1 | 10/2014 | Frohlich et al. |
| 2014/0353471 A1 | 12/2014 | Raynor et al. |
| 2015/0041625 A1 | 2/2015 | Dutton et al. |
| 2015/0062558 A1 | 3/2015 | Koppal et al. |
| 2015/0131080 A1* | 5/2015 | Retterath .............. G01S 17/10 356/5.01 |
| 2015/0163429 A1 | 6/2015 | Dai et al. |
| 2015/0192676 A1 | 7/2015 | Kotelnikov et al. |
| 2015/0200222 A1 | 7/2015 | Webster |
| 2015/0200314 A1 | 7/2015 | Webster |
| 2015/0204978 A1 | 7/2015 | Hammes et al. |
| 2015/0260830 A1 | 9/2015 | Ghosh et al. |
| 2015/0285625 A1* | 10/2015 | Deane .................. G01S 7/4817 348/140 |
| 2015/0362585 A1 | 12/2015 | Ghosh et al. |
| 2015/0373322 A1 | 12/2015 | Goma et al. |
| 2016/0003944 A1 | 1/2016 | Schmidtke et al. |
| 2016/0041266 A1 | 2/2016 | Smits |
| 2016/0072258 A1 | 3/2016 | Seurin et al. |
| 2016/0080709 A1 | 3/2016 | Viswanathan et al. |
| 2016/0182101 A1 | 6/2016 | Marcovic et al. |
| 2016/0259038 A1 | 9/2016 | Retterath et al. |
| 2016/0259057 A1 | 9/2016 | Ito |
| 2016/0274222 A1 | 9/2016 | Yeun |
| 2016/0334508 A1 | 11/2016 | Hall et al. |
| 2016/0344965 A1 | 11/2016 | Grauer |

(56) References Cited

U.S. PATENT DOCUMENTS

| | | |
|---|---|---|
| 2017/0006278 A1 | 1/2017 | Vandame et al. |
| 2017/0038459 A1 | 2/2017 | Kubacki et al. |
| 2017/0052065 A1 | 2/2017 | Sharma et al. |
| 2017/0067734 A1 | 3/2017 | Heidemann et al. |
| 2017/0068393 A1 | 3/2017 | Viswanathan et al. |
| 2017/0131388 A1 | 5/2017 | Campbell et al. |
| 2017/0131718 A1 | 5/2017 | Matsumura et al. |
| 2017/0139041 A1 | 5/2017 | Drader et al. |
| 2017/0176577 A1 | 6/2017 | Halliday |
| 2017/0176579 A1 | 6/2017 | Niclass et al. |
| 2017/0179173 A1 | 6/2017 | Mandai et al. |
| 2017/0184450 A1 | 6/2017 | Doylend et al. |
| 2017/0184704 A1 | 6/2017 | Yang et al. |
| 2017/0184709 A1 | 6/2017 | Kenzler et al. |
| 2017/0188016 A1 | 6/2017 | Hudman |
| 2017/0219695 A1 | 8/2017 | Hall et al. |
| 2017/0242102 A1 | 8/2017 | Dussan et al. |
| 2017/0242108 A1 | 8/2017 | Dussan et al. |
| 2017/0257617 A1 | 9/2017 | Retterath |
| 2017/0269209 A1 | 9/2017 | Hall et al. |
| 2017/0303789 A1 | 10/2017 | Tichauer et al. |
| 2017/0329010 A1 | 11/2017 | Warke et al. |
| 2017/0343675 A1 | 11/2017 | Oggier et al. |
| 2017/0356796 A1 | 12/2017 | Nishio |
| 2017/0356981 A1 | 12/2017 | Yang et al. |
| 2018/0045816 A1 | 2/2018 | Jarosinski et al. |
| 2018/0059220 A1 | 3/2018 | Irish et al. |
| 2018/0062345 A1 | 3/2018 | Bills et al. |
| 2018/0081032 A1 | 3/2018 | Torruellas et al. |
| 2018/0081041 A1 | 3/2018 | Niclass et al. |
| 2018/0115762 A1 | 4/2018 | Bulteel et al. |
| 2018/0131449 A1 | 5/2018 | Kare et al. |
| 2018/0167602 A1 | 6/2018 | Pacala et al. |
| 2018/0203247 A1 | 7/2018 | Chen et al. |
| 2018/0205943 A1 | 7/2018 | Trail |
| 2018/0209846 A1 | 7/2018 | Mandai et al. |
| 2018/0259645 A1 | 9/2018 | Shu et al. |
| 2018/0299554 A1 | 10/2018 | Van Dyck et al. |
| 2018/0341009 A1 | 11/2018 | Niclass et al. |
| 2019/0004156 A1 | 1/2019 | Niclass et al. |
| 2019/0011556 A1 | 1/2019 | Pacala et al. |
| 2019/0011567 A1 | 1/2019 | Pacala et al. |
| 2019/0018117 A1 | 1/2019 | Perenzoni et al. |
| 2019/0018118 A1 | 1/2019 | Perenzoni et al. |
| 2019/0018119 A1 | 1/2019 | Laifenfeld et al. |
| 2019/0018143 A1 | 1/2019 | Thayer et al. |
| 2019/0037120 A1 | 1/2019 | Ohki |
| 2019/0056497 A1 | 2/2019 | Pacala et al. |
| 2019/0094364 A1 | 3/2019 | Fine et al. |
| 2019/0170855 A1 | 6/2019 | Keller et al. |
| 2019/0178995 A1 | 6/2019 | Tsai et al. |
| 2019/0257950 A1 | 8/2019 | Patanwala et al. |
| 2019/0277952 A1 | 9/2019 | Beuschel et al. |
| 2019/0361404 A1 | 11/2019 | Mautner et al. |
| 2020/0142033 A1 | 5/2020 | Shand |
| 2020/0233068 A1 | 7/2020 | Henderson et al. |
| 2020/0256669 A1 | 8/2020 | Roth et al. |
| 2020/0256993 A1 | 8/2020 | Oggier |
| 2020/0314294 A1 | 10/2020 | Schoenlieb et al. |
| 2020/0386890 A1 | 10/2020 | Oggier et al. |

FOREIGN PATENT DOCUMENTS

| | | |
|---|---|---|
| CN | 103763485 A | 4/2014 |
| CN | 103983979 A | 8/2014 |
| CN | 104730535 A | 6/2015 |
| CN | 104914446 A | 9/2015 |
| CN | 105992960 A | 10/2016 |
| CN | 106405572 A | 2/2017 |
| CN | 110609293 A | 12/2019 |
| DE | 202013101039 U1 | 3/2014 |
| DE | 102015013710 A1 | 4/2017 |
| EP | 2157445 A2 | 2/2010 |
| EP | 2322953 A1 | 5/2011 |
| EP | 2469297 A1 | 6/2012 |
| EP | 2477043 A1 | 7/2012 |
| EP | 2827175 A2 | 1/2015 |
| EP | 3285087 A1 | 2/2018 |
| EP | 3318895 A1 | 5/2018 |
| EP | 3521856 A1 | 8/2019 |
| JP | H02287113 A | 11/1990 |
| JP | H0567195 A | 3/1993 |
| JP | 09197045 A | 7/1997 |
| JP | H10170637 A | 6/1998 |
| JP | H11063920 A | 3/1999 |
| JP | 2011089874 A | 5/2011 |
| JP | 2011237215 A | 11/2011 |
| JP | 2013113669 A | 6/2013 |
| JP | 2014059301 A | 4/2014 |
| KR | 101318951 B1 | 10/2013 |
| WO | 9008946 A1 | 8/1990 |
| WO | 2007144565 A2 | 12/2007 |
| WO | 2010149593 A1 | 12/2010 |
| WO | 2011041040 A1 | 4/2011 |
| WO | 2012154356 A1 | 11/2012 |
| WO | 2013028691 A1 | 2/2013 |
| WO | 2014066178 A1 | 5/2014 |
| WO | 2015199615 A1 | 12/2015 |
| WO | 2016034408 A1 | 3/2016 |
| WO | 2017106875 A1 | 6/2017 |
| WO | 2018122560 A1 | 7/2018 |
| WO | 2020101576 A1 | 5/2020 |
| WO | 2020109378 A1 | 6/2020 |
| WO | 2020201452 A1 | 10/2020 |

OTHER PUBLICATIONS

Niclass et al., "A 0.18 um CMOS SoC for a 100m range, 10 fps 200x96 pixel Time of Flight depth sensor", IEEE International Solid- State Circuits Conference- (ISSCC), Session 27, Image Sensors, 27.6, pp. 488-490, Feb. 20, 2013.

Walker et al., "A 128x96 pixel event-driven phase-domain ΔΣ-based fully digital 3D camera in 0.13μm CMOS imaging technology", IEEE International Solid- State Circuits Conference- (ISSCC), Session 23, Image Sensors, 23.6, pp. 410-412, Feb. 23, 2011.

Niclass et al., "Design and characterization of a 256x64-pixel single-photon imager in CMOS for a MEMS-based laser scanning time of-flight sensor", Optics Express, vol. 20, issue 11, pp. 11863-11881, May 21, 2012.

Kota et al., "System Design and Performance Characterization of a MEMS-Based Laser Scanning Time-of-Flight Sensor Based on a 256 x 64-pixel Single-Photon Imager", IEEE Photonics Journal, vol. 5, issue 2, pp. 1-15, Apr. 2013.

Webster et al., "A silicon photomultiplier with >30% detection efficiency from 450-750nm and 11.6μm pitch NMOS-only pixel with 21.6% fill factor in 130nm CMOS", Proceedings of the European Solid-State Device Research Conference (ESSDERC), pp. 238-241, Sep. 7-21, 2012.

Bradski et al., "Learning OpenCV", first edition, pp. 1-50, O'Reilly Media, Inc, California, USA, year 2008.

Buttgen et al., "Pseudonoise Optical Modulation for Real-Time 3-D Imaging With Minimum Interference", IEEE Transactions on Circuits and Systems I: Regular Papers, vol. 54, Issue10, pp. 2109-2119, Oct. 1, 2007.

Morbi et al., "Short range spectral lidar using mid-infrared semiconductor laser with code division multiplexing technique", Technical Digest, CLEO 2001, pp. 491-492, May 2001.

Al et al., "High-resolution random-modulation cw lidar", Applied Optics, vol. 50, issue 22, pp. 4478-4488, Jul. 28, 2011.

Chung et al., "Optical orthogonal codes: design, analysis and applications", IEEE Transactions on Information Theory, vol. 35, issue 3, pp. 595-604, May 1989.

Lin et al., "Chaotic lidar", IEEE Journal of Selected Topics in Quantum Electronics, vol. 10, issue 5, pp. 991-997, Sep.-Oct. 2004.

U.S. Appl. No. 15/844,665 office action dated Jun. 1, 2020.

U.S. Appl. No. 15/950,186 office action dated Jun. 23, 2020.

International Application PCT/US2017/066919 Search Report dated Sep. 27, 2018.

U.S. Appl. No. 16/752,653 Office Action dated Oct. 1, 2021.

(56) References Cited

OTHER PUBLICATIONS

EP Application # 17737420.4 Office Action dated Oct. 28, 2021.
KR Application # 1020200068248 Office Action dated Nov. 12, 2021.
KR Application # 1020207015906 Office Action dated Oct. 13, 2021.
U.S. Appl. No. 16/679,360 Office Action dated Jun. 29, 2022.
EP Application # 22167103.5 Search Report dated Jul. 11, 2022.
CN Application # 201780058088.4 Office Action dated Aug. 23, 2022.
U.S. Appl. No. 16/885,316 Office Action dated Jun. 30, 2022.
U.S. Appl. No. 16/532,513 Office Action dated Aug. 4, 2022.
JP Application # 2020001203 Office Action dated Feb. 4, 2021.
U.S. Appl. No. 16/752,653 Office Action dated Feb. 4, 2021.
CN Application # 201810571820.4 Office Action dated Sep. 9, 2022.
KR Application # 1020220101419 Office Action dated Sep. 28, 2022.
U.S. Appl. No. 17/026,365 Office Action dated Nov. 7, 2022.
U.S. Appl. No. 16/532,513 Office Action dated Nov. 23, 2022.
U.S. Appl. No. 16/532,517 Office Action dated Oct. 14, 2020.
EP Application # 20177707.5 Search Report dated Nov. 12, 2020.
IN Application # 202117029897 Office Action dated Mar. 10, 2022.
IN Application # 202117028974 Office Action dated Mar. 2, 2022.
U.S. Appl. No. 17/079,548 Office Action dated Mar. 3, 2023.
CN Application # 201780097602.5 Office Action dated Mar. 15, 2023.
CN Application # 202010063812.6 Office Action dated Mar. 18, 2023.
KR Application # 1020217025136 Office Action dated Apr. 4, 2023.
U.S. Appl. No. 17/026,365 Office Action dated Jan. 26, 2023.
International Application # PCT/US2020/058760 Search Report dated Feb. 9, 2021.
TW Application # 109119267 Office Action dated Mar. 10, 2021.
U.S. Appl. No. 16/752,653 Office Action dated Apr. 5, 2021.
EP Application No. 20177707 Search Report dated Sep. 29, 2020.
CN Application # 201680074428.8 Office Action dated Jun. 23, 2021.
Zhu Jian, "Research of Simulation of Super-Resolution Reconstruction of Infrared Image", abstract page, Master's Thesis, p. 1, Nov. 15, 2005.
Zhu et al., "Measurement Method for Real-Time Transmission of Optical Signal Based on Single Photon Detection," Chinese Journal of Lasers, vol. 43, No. 2, pp. 1-6, year 2016.
Yang, "The Study of Phase-Demodulation Range-Finding Techniques Based o SPAD," Chinese Master's Thesis Full-text Database, Engineering Science and Technology, Xiangtan University, pp. 1-63, May 2016.
Zhang, "Structured Light Based Fast and High Accuracy Depth Sensing," China Doctoral Dissertations Full-text Database, Information Science and Technology, University of Science and Technology of China, pp. 1-110, Apr. 2015.
Ionescu et al., "A 3D NIR Camera for Gesture Control of Video Game Consoles," Conference Paper, 2014 IEEE International Conference on Computational Intelligence and Virtual Environments for Measurement Systems and Applications (CIVEMSA), pp. 1-5, year 2014.
CN Application # 201780097602.5 Notice of Allowance dated Jul. 12, 2023.

\* cited by examiner

TIME-OF-FLIGHT SENSING USING AN ADDRESSABLE ARRAY OF EMITTERS

FIELD OF THE INVENTION

The present invention relates generally to range sensing, and particularly to devices and methods for depth mapping based on time-of-flight measurement.

BACKGROUND

Time-of-flight (ToF) imaging techniques are used in many depth mapping systems (also referred to as 3D mapping or 3D imaging). In direct ToF techniques, a light source, such as a pulsed laser, directs pulses of optical radiation toward the scene that is to be mapped, and a high-speed detector senses the time of arrival of the radiation reflected from the scene. The depth value at each pixel in the depth map is derived from the difference between the emission time of the outgoing pulse and the arrival time of the reflected radiation from the corresponding point in the scene, which is referred to as the "time of flight" of the optical pulses. The radiation pulses that are reflected back and received by the detector are also referred to as "echoes."

Single-photon avalanche diodes (SPADs), also known as Geiger-mode avalanche photodiodes (GAPDs), are detectors capable of capturing individual photons with very high time-of-arrival resolution, on the order of a few tens of picoseconds. They may be fabricated in dedicated semiconductor processes or in standard CMOS technologies. Arrays of SPAD sensors, fabricated on a single chip, have been used experimentally in 3D imaging cameras. Charbon et al. provide a review of SPAD technologies in "SPAD-Based Sensors," published in *TOF Range-Imaging Cameras* (Springer-Verlag, 2013).

SUMMARY

Embodiments of the present invention that are described hereinbelow provide improved apparatus and methods for direct ToF sensing.

There is therefore provided, in accordance with an embodiment of the invention, optical sensing apparatus, including an array of emitters, which are configured to emit pulses of optical radiation at different, respective times in response to a control input applied to the array. A receiver includes a plurality of detectors, which are configured to output signals indicative of times of arrival of photons at the detectors. Optics are configured to project the optical radiation from the emitters onto respective locations in a scene and to image the respective locations onto corresponding pixels of the receiver, each pixel including one or more of the detectors. A controller is coupled to control the emitters to emit the output pulses in a predefined spatio-temporal sequence, and to collect and process the signals output by corresponding pixels in synchronization with the spatio-temporal sequence so as to measure respective times of flight of the pulses to and from the respective locations in the scene.

In a disclosed embodiment, the emitters include vertical-cavity surface-emitting lasers (VCSELs).

Additionally or alternatively, the detectors include single-photon sensors, and the receiver includes at least one time-to-digital converter (TDC), which outputs a digital value indicative of a delay between a pulse emitted by one of the emitters and receipt of a photon at a corresponding pixel of the receiver. In some embodiments, each of the emitters is driven to emit a series of the pulses in accordance with the predefined spatio-temporal sequence, and the controller is configured to accumulate, for each pixel, a respective histogram of digital values output by the at least one TDC in response to the series of the pulses, and to derive a respective time of flight from the histogram. In one embodiment, the controller is configured to modify the spatio-temporal sequence by varying a number of the pulses in the series of the pulses emitted by each of the emitters.

Further additionally or alternatively, both the emitters and the single-photon sensors are arranged in respective matrices including multiple rows and multiple columns, wherein the at least one TDC includes multiple TDCs with each TDC coupled to a different, respective row of the single-photon sensors, and the spatio-temporal sequence is defined so that at least first and second emitters, in different, respective rows of the array emit the pulses concurrently, while no more than a single emitter in each of the rows is operative at any given time.

In further embodiments, the spatio-temporal sequence is defined so that at least first and second emitters emit respective first and second pulses with an interval between the pulses that is less than half an average of the times of flight of the pulses to and from the respective locations in the scene. In a disclosed embodiment, the at least first and second emitters belong respectively to first and second groups of the emitters, such that the emitters in each of the groups are spaced apart over the array and emit the pulses simultaneously.

In some embodiments, the controller is configured, after measuring first times of flight in accordance with an initial spatio-temporal sequence, to modify the spatio-temporal sequence and measure second times of flight in accordance with the modified spatio-temporal sequence. In one embodiment, the spatio-temporal sequence is modified so as to measure the second times of flight with a resolution that is finer than the resolution of the first times of flight.

There is also provided, in accordance with an embodiment of the invention, a method for optical sensing, which includes emitting pulses of optical radiation from an array of emitters at different, respective times in a predefined spatio-temporal sequence. The optical radiation is projected from the emitters onto respective locations in a scene. The respective locations are imaged onto corresponding pixels of a receiver, which outputs signals indicative of times of arrival of photons at the corresponding pixels. The signals output by corresponding pixels are collected and processed in synchronization with the spatio-temporal sequence so as to measure respective times of flight of the pulses to and from the respective locations in the scene.

The present invention will be more fully understood from the following detailed description of the embodiments thereof, taken together with the drawings in which:

DETAILED DESCRIPTION OF EMBODIMENTS

Figure 1:
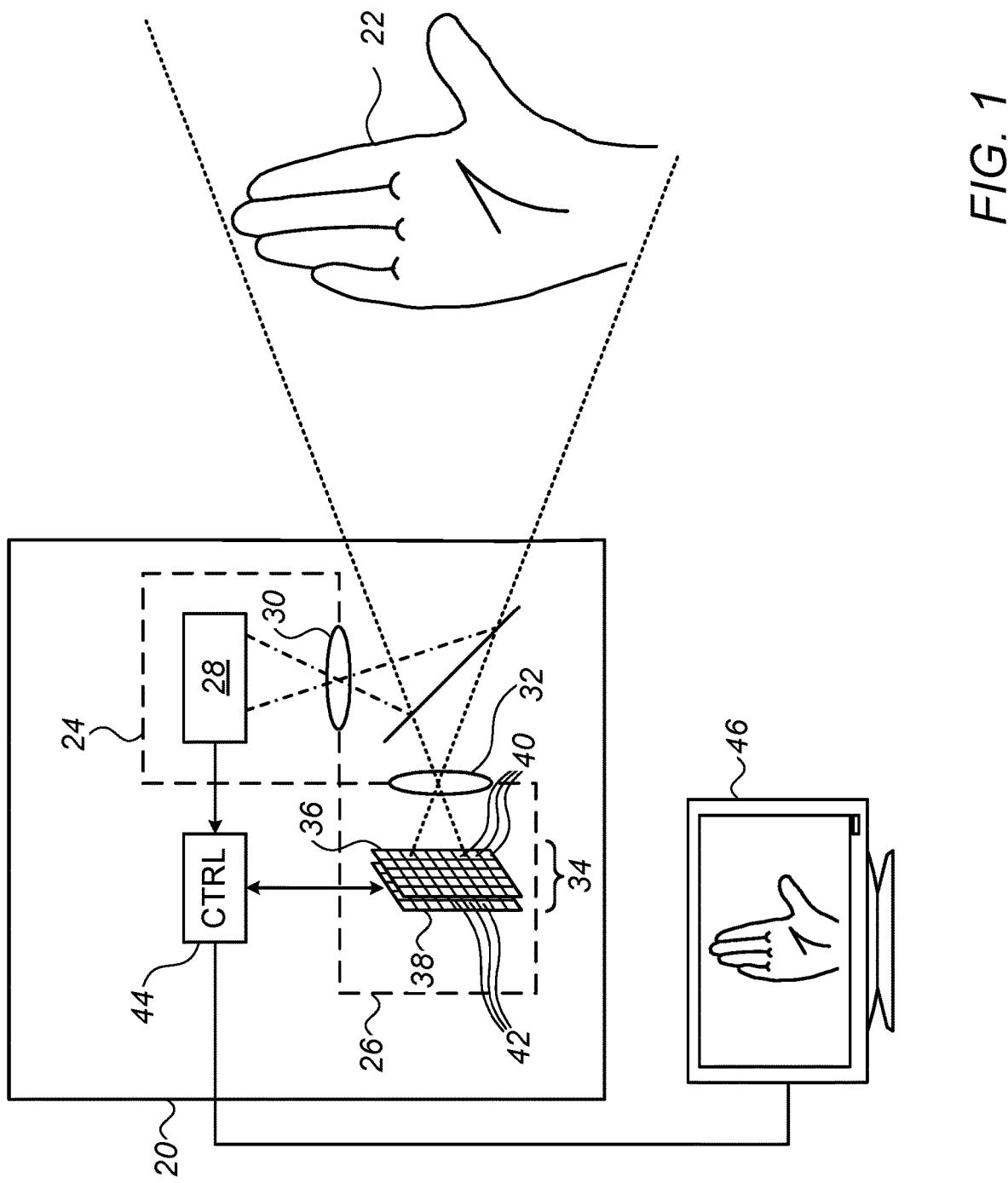
FIG. 1 is a schematic side view of a depth mapping device, in accordance with an embodiment of the invention.

In direct ToF depth mapping systems that are known in the art, the data acquisition rate is limited by the distance to the target that is to be mapped: The light source emits a bright pulse of radiation, and the system then waits for a time no less than the time of flight of the photons to the target and back to the receiver before the next pulse can be fired. In other words, the system waits a fixed amount of time, which corresponds to the maximum working distance, i.e., the maximum distance to a target object that could be measured by the system. (If the pulse repetition period were to be less than the time of flight, the receiver might not be able to distinguish between the echoes of successive pulses, leading to problems of aliasing in the ToF measurements.) Considering that laser sources used in such systems typically have pulse widths less than 1 ns, while time of flight (in air) grows at 6 ns per meter of distance to the target, the limitation on the pulse rate means that the light source operates at a very low duty cycle. Therefore, the light source may have to emit very intense pulses in order to achieve good resolution and signal/noise ratio with acceptable measurement throughput.

Embodiments of the present invention that are described herein address these limitations by using an array of emitters, which can be driven to emit pulses of optical radiation at different, respective times in response to a control input applied to the array. Arrays of this sort can be produced, for example, by integrating emitters with control circuits in a single chip. In one such embodiment, a III-V semiconductor substrate on which the emitters are fabricated is bonded to a silicon substrate on which control circuits for the emitters are fabricated. This structure makes it possible to address and fire the emitters in the array individually in substantially any desired spatio-temporal sequence.

In the disclosed embodiments, optics project the optical radiation from the emitters onto respective locations in a scene and image these locations onto corresponding pixels of a receiver. The receiver comprises an array of detectors, which output signals indicative of times of arrival of photons at the detectors. Each pixel comprises one or more of the detectors (i.e., each location in the scene onto which an emitter beam is projected can be imaged back onto a single detector or onto a group of neighboring detectors, whose output signals are then pooled into one pixel). Thus, each pixel detects the time of arrival of the photons transmitted from a particular, corresponding emitter in the array.

This arrangement makes it possible for a controller to control the emitters to emit their output pulses in a pre-defined spatio-temporal sequence, and to collect and process the signals output by the corresponding pixels in synchronization with the spatio-temporal sequence so as to measure respective times of flight of the pulses to and from the respective locations in the scene. The term "spatio-temporal sequence" refers to the spatial order in which the particular emitters fire their pulses and the intervals between the successive pulses, which may be fired by the same or different emitters.

Various spatio-temporal sequences may be defined in order to optimize performance and meet throughput and resolution requirements. For example, the spatio-temporal sequence may be defined such that multiple emitters, in different locations in the array, emit their pulses simultaneously. Additionally or alternatively, the sequence may be defined so that different emitters in different locations emit their respective pulses with an interval between the pulses that is substantially less than the expected time of flight based on the range of working distances at which measurements are to be made. For example, the interval between pulses is typically less than half the average of the times of flight of the pulses to and from the respective locations in the scene. In both cases, there is little risk of aliasing, since the resulting echoes will be captured concurrently by different, respective pixels of the receiver. This arrangement is beneficial both in increasing the acquisition throughput of ToF data and increasing the overall duty cycle of the emitter array, and thus mitigating problems that otherwise arise due to emission of very bright pulses with high peak power.

Furthermore, the spatio-temporal sequence may be modified in the course of system operation in order to optimize ToF data acquisition. For example, the sequence may be chosen originally in order to acquire ToF data rapidly at coarse resolution, and then modified to acquire the ToF data at finer resolution, either over the entire field of view of the system or only within a certain reduced region of interest. "Resolution" in this context may mean either or both of transverse resolution, corresponding to the density of the pixels in the resulting depth map, and depth resolution, corresponding to the precision of the measured ToF values. (Depth resolution varies statistically as a function of the number of pulses emitted by a given emitter and sensed at the corresponding pixel in order to generate a ToF measurement for the respective location in the scene.) Alternatively or additionally, the spatio-temporal sequence may be switched over time in order to defeat possible interference due to other radiation sources in the vicinity.

FIG. 1 is a schematic side view of a depth mapping device 20, in accordance with an embodiment of the invention. In the pictured embodiment, device 20 is used to generate depth maps of a scene including an object 22, which in this example is a part of the body of a user of the device. To generate the depth map, an illumination assembly 24 directs pulses of light toward object 22, and a receiver 26 measures the ToF of the photons reflected from the object. (The term "light," as used in the present description and in the claims, refers to optical radiation, which may be in any of the visible, infrared, and ultraviolet ranges.)

Illumination assembly 24 typically comprises an array of emitters, such as a pulsed laser array 28. The lasers emit short pulses of light, with pulse duration in the nanosecond or sub-nanosecond range, and with on-board control that enables the individual lasers to be fired in a desired spatio-temporal sequence with sub-nanosecond precision. Array 28 may comprise, for example, an addressable VCSEL array. Collection optics 30 direct the light toward object 22.

Alternatively, other pulse durations and repetition frequencies may be used, depending on application requirements.

Receiver 26 comprises objective optics 32, which image object 22 onto a sensing array 34, so that photons emitted by illumination assembly 24 and reflected from object 22 are incident on the sensing array. In the pictured embodiment, sensing array 34 comprises a sensor chip 36 and a processing chip 38, which are coupled together, for example, using chip stacking techniques that are known in the art. Sensor chip 36 comprises an array of high-speed single-photon detectors, arranged in a matrix of rows and columns.

In some embodiments, the photodetectors in sensor chip 36 comprise an array of SPADs 40, each of which outputs a signal indicative of the times of incidence of photons on the SPAD following emission of pulses by illumination assembly 24. Processing chip 38 comprises an array of processing circuits 42, which are coupled respectively to the sensing elements. Both of chips 36 and 38 may be produced from silicon wafers using well-known CMOS fabrication processes, based on SPAD sensor designs that are known in the art, along with accompanying drive circuits, logic and memory.

Alternatively, the designs and principles of detection that are described herein may be implemented, mutatis mutandis, using other circuits, materials and processes. For example, sensing array 34 may comprise an array of avalanche photodiodes with suitable supporting and processing circuits, as are known in the art. All such alternative implementations are considered to be within the scope of the present invention.

Receiver 26 outputs signals that are indicative of respective times of arrival of the photons received at each pixel (corresponding to a SPAD 40 or group of neighboring SPADs), or equivalently, from each location in the scene that is being mapped. These output signals are typically in the form of respective digital values of the times of arrival that are generated by processing circuits 42, although other signal formats, both digital and analog, are also possible. For example, in some embodiments, processing circuits 42 comprise one or more time-to-digital converters (TDCs), which output digital values indicative of the delays between pulses emitted by respective emitters in array 28 and receipt of a photon at a corresponding pixel of receiver 26. Circuits 42 may comprise a respective dedicated TDC for each pixel. Alternatively, for appropriate choices of the spatio-temporal pattern of pulse emission, the TDCs can be shared by multiple pixels, for example with a single TDC per row (or equivalently, per column) of the detector array.

A controller 44 reads out the individual pixel values and processes the times of arrival, in synchronization with the spatio-temporal sequence of emission by the corresponding emitters, in order to generate an output depth map, comprising the ToF measured at each pixel to and from the respective locations in the scene, or equivalently, the measured depth value. In some embodiments, the spatio-temporal sequence is defined such that each of the emitters in array 28 is driven to emit a series of pulses, and sensing array 34 outputs a digital time-of-arrival value from the appropriate pixel in response to each emitted pulse. Controller 44 accumulates, for each pixel, a respective histogram of the digital values output from the pixel in response to the series of the pulses, and derives the respective time of flight from the histogram, for example by taking the mode of the histogram. This histogram-based approach is useful in smoothing out the statistical variations and noise in photon arrival time, and the depth resolution typically increases with the number of pulses captured at each pixel. Controller 44 conveys the depth map to a receiving device 46, such as a display or a computer or other processor, which segments and extracts high-level information from the depth map, but these features are beyond the scope of the present disclosure.

Although the present description relates to controller 44 and processing chip 38 as separate entities, with a certain division of functions between the controller and processing chip, in practice these entities and their functions may be combined and implemented monolithically on the same integrated circuit. Alternatively, other divisions of functionality between these entities will also be apparent to those skilled in the art and are considered to be within the scope of the present invention. Therefore, in the present description and in the claims, the term "controller" should be understood as encompassing all implementations of the functionalities that are attributed to controller 44 and processing chip 38, whether carried out in hardware logic or in software.

Figure 2:
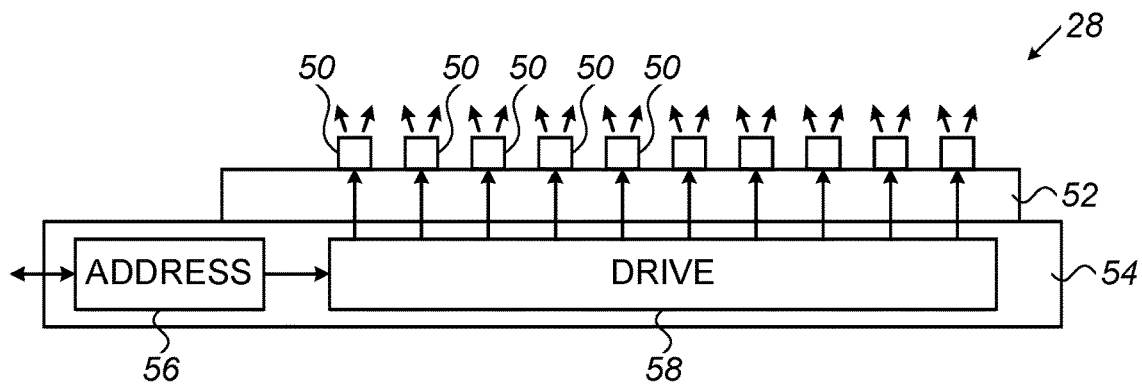
FIG. 2 is a block diagram that schematically illustrates an integrated emitter array, in accordance with an embodiment of the invention.

FIG. 2 is a block diagram that schematically illustrates integrated emitter array 28, in accordance with an embodiment of the invention. VCSELs 50 in array 28 are produced by epitaxial growth on a suitable III-V semiconductor substrate 52, such as a GaAs substrate. In a separate step, control circuits for the VCSELs are formed on a silicon substrate 54, using a CMOS process, for example. III-V substrate 52 is then bonded to silicon substrate 54, with each VCSEL 50 in alignment with its respective control circuits. In the pictured embodiment, drive circuits 58 on substrate 54 include a driver for each VCSEL 50, with a separate anode and/or cathode connection to enable independent control of the VCSEL. An addressing circuit 56 triggers drive circuits 58 to fire the VCSELs in accordance with a predefined spatio-temporal sequence, which is input to addressing circuit 56, for example, by controller 44.

Figure 3A:
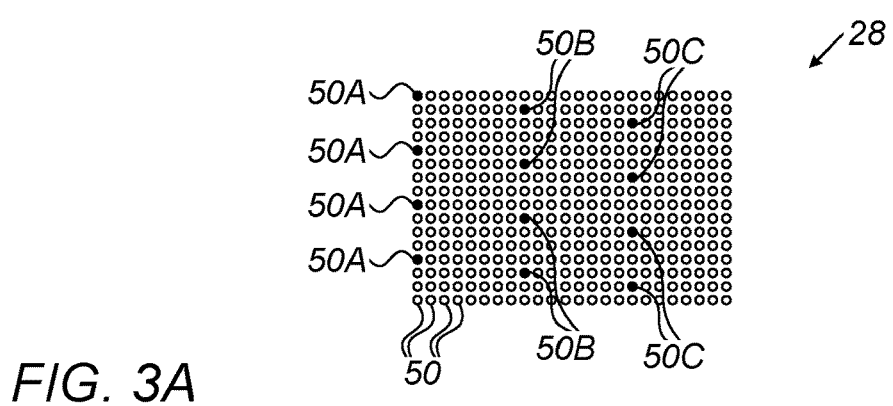
FIGS. 3A-C are schematic frontal views of an emitter array, showing successive stages in an emission sequence, in accordance with an embodiment of the invention.
Figure 3B:
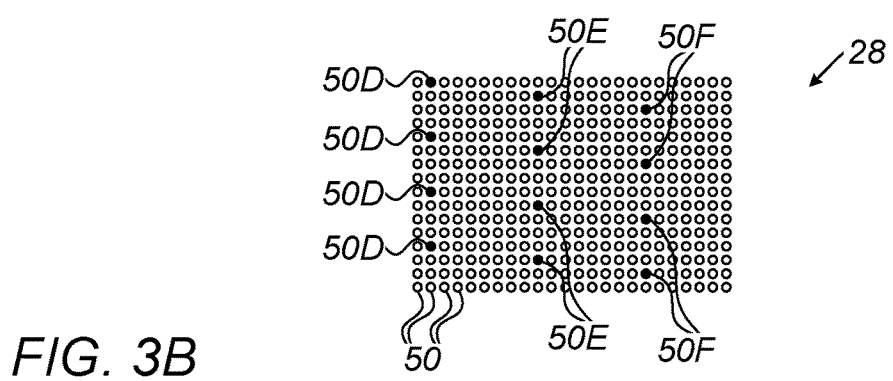
Figure 3C:
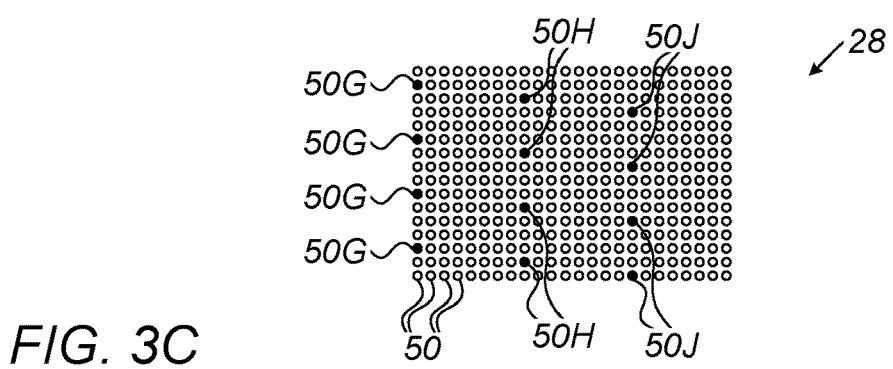
Figure 4:
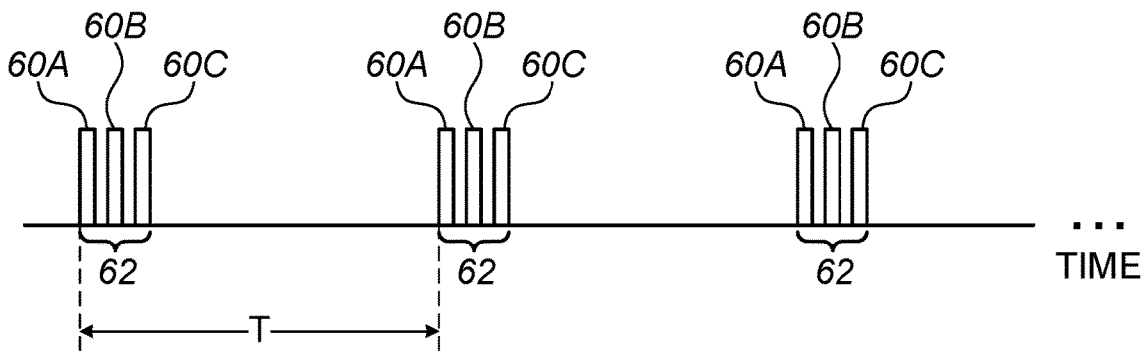
FIG. 4 is a plot that schematically illustrates the timing of pulses in the emission sequence of FIGS. 3A-C, in accordance with an embodiment of the invention.

Reference is now made to FIGS. 3A-C and 4, which schematically illustrate features of a spatio-temporal sequence of emission from array 28, in accordance with an embodiment of the invention. FIGS. 3A-C are frontal views of emitter array 28, showing successive stages in the emission sequence, while FIG. 4 is a plot showing the timing of pulses in the emission sequence.

In the pictured sequence, emitters 50 are divided into groups, labeled 50a, 50b, . . . , 50j, . . . . The emitters in each group belong to different, respective rows of the array and are spaced apart along a given column. The emitters in each group emit their respective pulses concurrently, with no more than a single emitter in each of the rows operative at any given time. The three groups that are shown in each of FIGS. 3A-C (for example, emitters 50a, emitters 50b and emitters 50c in FIG. 3A) are also spaced apart over array 28. In the pictured sequence, for example, the emitters in each of these groups are located in different rows and in columns that are widely separated. Thus, the respective pixels of sensing array 34 that will receive the reflected photons from these emitters are also widely spaced within each group and among the different groups.

As a result of this spatial distribution, emitters 50a, 50b and 50c (and similarly the emitter groups in FIGS. 3B and 3C) can be driven to emit their respective pulses with an interval between the pulses that is substantially shorter than the times of flight of the pulses to and from the respective locations in the scene being mapped by device 20. The wide spacing of the emitters within and between the groups ensures that there will not be significant crosstalk between the pixels, and thus no significant aliasing on this account. For example, the interval between the pulses emitted from the different groups may be less than half the average time of flight, or even substantially less, as shown in FIG. 4. The wide spacing of the emitters is also useful in spreading the emitted power from array 28 widely over the scene being mapped, rather than focusing in a single location at any given time.

FIG. 4 shows an example of this sort of temporal scheme, with a train 62 of optical pulses 60a, 60b and 60c emitted periodically by the groups of emitters 50a, 50b and 50c, respectively. Pulses 60a, 60b, 60c typically have respective pulse widths of 1 ns or less, and the interval between the pulses in each train 62 is likewise on the order of 1 ns. Pulse train 62 is repeated with a period T, which is chosen to be greater than the expected time of flight to and from locations in the scene being mapped, for example 10 ns for nearby targets. The tight spacing of the pulses emitted by the different groups of emitters is useful in increasing the duty cycle and reducing the peak emission power of array 28, as well as increasing the measurement throughput of device 20. Alternatively, other pulse widths and repetition periods may be used, depending on application requirements and choice of components.

Pulse train 62 is typically repeated multiple times for emitters 50*a*, 50*b* and 50*c*, in order to enable controller 44 to build a suitable histogram of photon arrival times at each pixel in these groups. By virtue of the choice of emitters in these groups, with each group drawn from a separate set of rows of laser array 28, the histograms can be accumulated using a single, respective TDC serving each row of sensor array 34. To identify possible aliasing due to distant objects, the repetition period T may be dithered, in which case aliased histogram peaks (due to distant reflections from a previous pulse train) will be dithered, as well, and can be eliminated from the depth map on this basis.

After applying the desired series of pulse trains 62 to the groups of emitters 50*a*, 50*b* and 50*c*, a similar series of pulse trains is applied to emitters 50*d*, 50*e*, and 50*f*, and then to emitters 50*g*, 50*h* and 50*j*, and so forth until the entire array 28 has been covered. Alternatively, in some embodiments (as illustrated below in FIG. 5A/B, for example), the spatio-temporal sequence may use only a subset of emitters 50 in array 28. Further alternatively, other spatial groupings and temporal sequences may be applied, as long as the separation between the groups in space and time is sufficient to avoid significant crosstalk between different pixels.

Although FIGS. 3A-C show an orderly rolling sequence of emission groups, other sorts of spatial patterns, including patterns that are irregular in spatial and/or temporal distribution, may be applied to array 28. Such irregular patterns (possibly including pseudo-random patterns) are useful in avoiding crosstalk and interference due to other depth mapping devices and other radiation sources in the vicinity of device 20.

In some embodiments, SPADs 40 in sensing array 34 are actuated in synchronization with the spatio-temporal sequence of firing emitters 50 in array 28. In other words, each SPAD is actuated only when the corresponding emitter is operative, and is effectively dormant otherwise. This mode of operation is useful in reducing noise in the ToF measurements. When applied in conjunction with the sort of spatio-temporal sequence that is illustrated in FIGS. 3A-C, the areas of active pixels and their acquisition triggers will roll smoothly across sensing array 34, thus facilitating efficient, low-noise acquisition of ToF values.

Figure 5A:
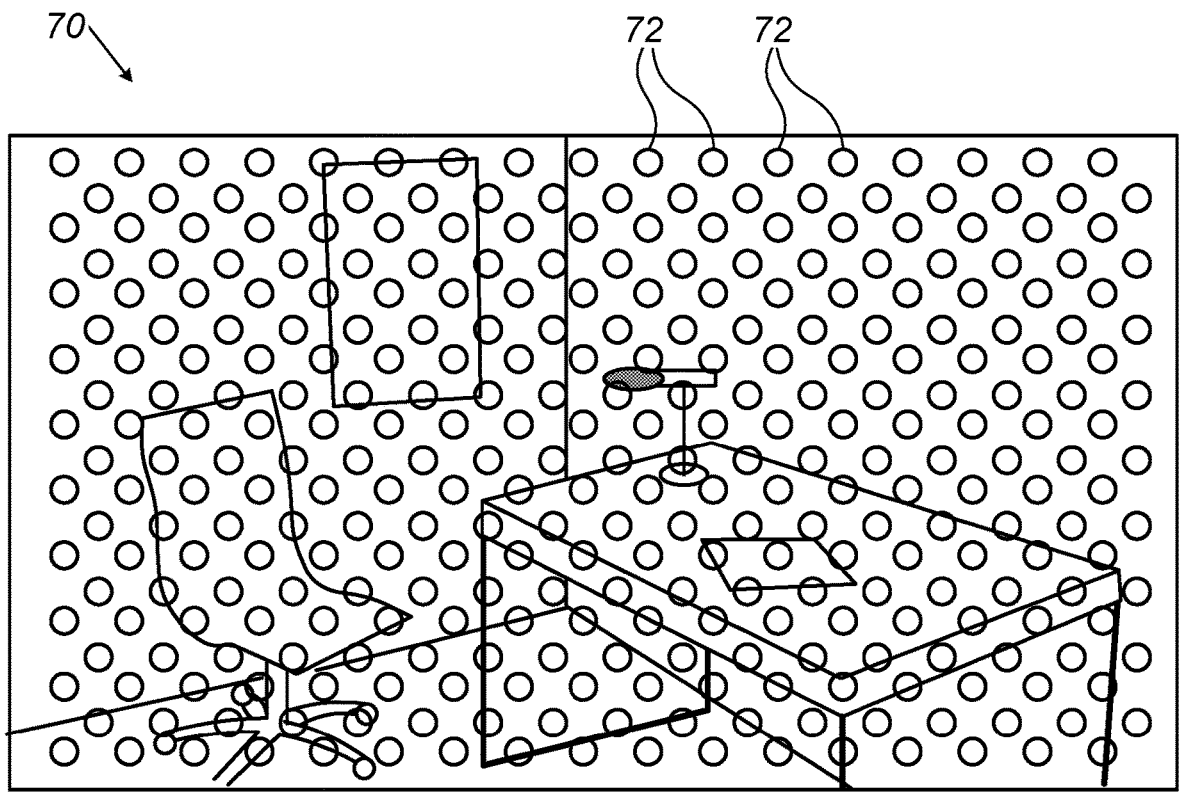
FIGS. 5A and 5B are schematic representation of a scene that is mapped by a depth mapping device, illustrating different, respective operational modes of an emitter array in the device, in accordance with an embodiment of the invention.
Figure 5B:
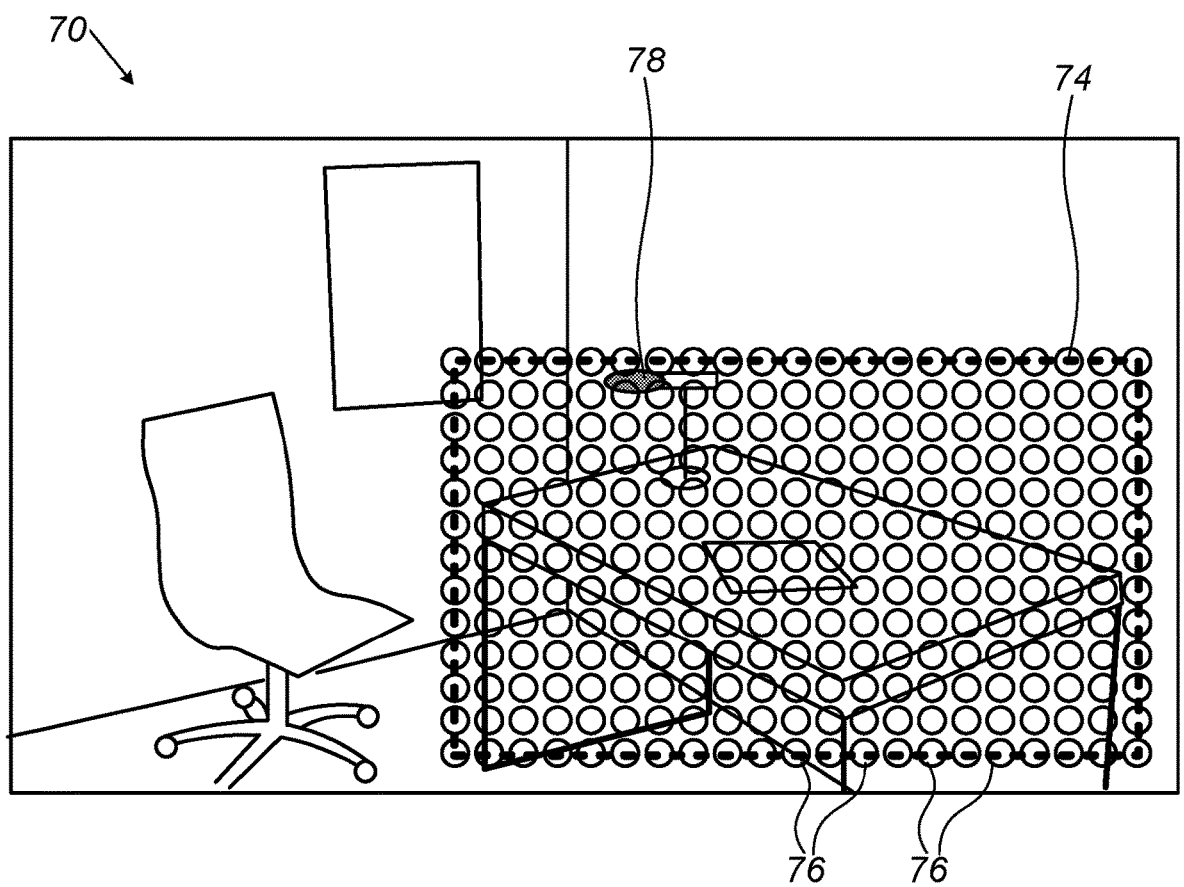

FIGS. 5A and 5B are schematic representation of a scene 70 that is mapped by device 20, illustrating different, respective operational modes of the device, in accordance with an embodiment of the invention. FIG. 5A illustrates an initial spatio-temporal sequence, in which only a subset of emitters 50 are actuated (for example, half of the emitters, as illustrated by the respective locations 72 in scene 70 that are illuminated by the emitters). Using this spatio-temporal sequence, controller 44 acquires an initial depth map of the scene with coarse transverse resolution, but with faster throughput than would be achieved if all of the emitters were to be used. Additionally or alternatively, the initial spatio-temporal sequence may include only a relatively small number of pulses emitted by each of the emitters, so that the depth resolution of the initial depth map is also relatively coarse.

After measuring the times of flight in accordance with the initial spatio-temporal sequence, controller 44 proceeds to re-measure the times of flight in accordance with a modified spatio-temporal sequence, as illustrated in FIG. 5B. Here, for example, a processor analyzing the initial depth map may have recognized an object of interest in scene 70, and therefore instructs controller 44 to acquire times of flight with finer resolution over a limited area 74 within the scene that contains the object of interest. All of emitters 50 that emit beams within area 74 are thus actuated, enabling device 20 to acquire ToF values at respective, densely-spaced locations 76, while the emitters outside this area are not used. Additionally or alternatively, the modified spatio-temporal sequence may include a larger number of pulses by each of the emitters illuminating area 74. By reducing the effective field of view to area 74, device 20 is able to generate a local depth map with finer resolution in the transvers and/or depth dimension, while maintaining high throughput.

In the modified spatio-temporal sequence illustrated in FIG. 5B, emitters 50 outside area 74 are not actuated in order to avoid wasting the resources of device 20 (such as the output power from array 28) on areas of scene 70 that are not of interest. This sort of conservation of resources can be further enhanced by deactivating emitters 50 even within area 74 if they are not able to give usable ToF values. For example, controller 44 may deactivate the emitter (or emitters) irradiating a bright spot 78 in scene 70 upon determining that sensing array 34 is unable to provide usable ToF values in this area due to saturation.

Thus, generally speaking, the parameters of the spatio-temporal sequence, including the choice of emitters and number of pulses applied by each emitter, may be selected and modified in order to give the optimal tradeoff between field of view, resolution and throughput. Although the embodiments described above refer, for the sake of concreteness and clarity, to a specific sort of device architecture that is capable of implementing this approach, the principles of the present invention may similarly be applied using other controllable emitter and sensor arrays, as will be apparent to those skilled in the art after reading the above disclosure. All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical sensing apparatus, comprising:
an array of emitters, which are configured to emit pulses of optical radiation at different, respective times in response to a control input applied to the array;
a receiver, comprising a plurality of pixels comprising single-photon sensors, which are configured to output signals indicative of times of arrival of photons at the detectors, and at least one time-to-digital converter (TDC), which outputs a digital value indicative of a delay between a pulse emitted by one of the emitters and receipt of a photon at a corresponding pixel of the receiver;
optics, which are configured to project the optical radiation from the emitters onto respective locations in a scene and to image the respective locations onto corresponding pixels of the receiver, each pixel comprising one or more of the detectors; and a controller, which is coupled to control the emitters to emit the output pulses in a predefined spatio-temporal sequence, and to collect and process the signals output by corresponding pixels in synchronization with the spatio-temporal sequence so as to measure respective times of flight of the pulses to and from the respective locations in the scene.

2. The apparatus according to claim 1, wherein the emitters comprise vertical-cavity surface-emitting lasers (VCSELs).

3. The apparatus according to claim 1, wherein in accordance with the predefined spatio-temporal sequence, each of the emitters is driven to emit a series of the pulses, and wherein the controller is configured to accumulate, for each pixel, a respective histogram of digital values output by the at least one TDC in response to the series of the pulses, and to derive a respective time of flight from the histogram.

4. The apparatus according to claim 3, wherein the controller is configured to modify the spatio-temporal sequence by varying a number of the pulses in the series of the pulses emitted by each of the emitters.

5. The apparatus according to claim 1, wherein both the emitters and the single-photon sensors are arranged in respective matrices comprising multiple rows and multiple columns, wherein the at least one TDC comprises multiple TDCs with each TDC coupled to a different, respective row of the single-photon sensors, and wherein the spatio-temporal sequence is defined so that at least first and second emitters, in different, respective rows of the array emit the pulses concurrently, while no more than a single emitter in each of the rows is operative at any given time.

6. The apparatus according to claim 1, wherein the spatio-temporal sequence is defined so that at least first and second emitters emit respective first and second pulses with an interval between the pulses that is less than half an average of the times of flight of the pulses to and from the respective locations in the scene.

7. The apparatus according to claim 6, wherein the at least first and second emitters belong respectively to first and second groups of the emitters, such that the emitters in each of the groups are spaced apart over the array and emit the pulses simultaneously.

8. The apparatus according to claim 1, wherein the controller is configured, after measuring first times of flight in accordance with an initial spatio-temporal sequence, to modify the spatio-temporal sequence and measure second times of flight in accordance with the modified spatio-temporal sequence.

9. Optical sensing apparatus, comprising:

an array of emitters, which are configured to emit pulses of optical radiation at different, respective times in response to a control input applied to the array;

a receiver, comprising a plurality of detectors, which are configured to output signals indicative of times of arrival of photons at the detectors;

optics, which are configured to project the optical radiation from the emitters onto respective locations in a scene and to image the respective locations onto corresponding pixels of the receiver, each pixel comprising one or more of the detectors; and a controller, which is coupled to control the emitters to emit the output pulses in a predefined spatio-temporal sequence, and to collect and process the signals output by corresponding pixels in synchronization with the spatio-temporal sequence so as to measure respective times of flight of the pulses to and from the respective locations in the scene, wherein the controller is configured, after measuring first times of flight in accordance with an initial spatio-temporal sequence, to modify the spatio-temporal sequence and measure second times of flight in accordance with the modified spatio-temporal sequence, and wherein the spatio-temporal sequence is modified so as to measure the second times of flight with a resolution that is finer than the resolution of the first times of flight.

10. A method for optical sensing, comprising:

emitting pulses of optical radiation from an array of emitters at different, respective times in a predefined spatio-temporal sequence;

projecting the optical radiation from the emitters onto respective locations in a scene;

imaging the respective locations onto corresponding pixels of a receiver comprising a matrix of single-photon sensors;

outputting signals from the receiver indicative of times of arrival of photons at the corresponding pixels, wherein outputting the signals comprises outputting a digital value indicative of a delay between a pulse emitted by one of the emitters and receipt of a photon at a corresponding pixel of the receiver; and collecting and processing the signals output by corresponding pixels in synchronization with the spatio-temporal sequence so as to measure respective times of flight of the pulses to and from the respective locations in the scene.

11. The method according to claim 10, wherein the emitters comprise vertical-cavity surface-emitting lasers (VCSELs), and wherein the pulses have a duration that is less than 1 ns.

12. The method according to claim 10, wherein in accordance with the predefined spatio-temporal sequence, each of the emitters is driven to emit a series of the pulses, and wherein collecting and processing the signals comprises accumulating, for each pixel, a respective histogram of digital values indicative of the delay in response to the series of the pulses, and deriving a respective time of flight from the histogram.

13. The method according to claim 12, and comprising modifying the spatio-temporal sequence by varying a number of the pulses in the series of the pulses emitted by each of the emitters.

14. The method according to claim 10, wherein both the emitters and the single-photon sensors are arranged in respective matrices comprising multiple rows and multiple columns, and wherein outputting the digital value comprises coupling a respective time-to-digital converter (TDC) to read out the digital value from each row of the single-photon sensors, and wherein the spatio-temporal sequence is defined so that at least first and second emitters, in different, respective rows of the array emit the pulses concurrently, while no more than a single emitter in each of the rows is operative at any given time.

15. The method according to claim 10, wherein the spatio-temporal sequence is defined so that at least first and second emitters emit respective first and second pulses with an interval between the pulses that is less than half an average of the times of flight of the pulses to and from the respective locations in the scene.

16. The method according to claim 15, wherein the at least first and second emitters belong respectively to first and second groups of the emitters, such that the emitters in each of the groups are spaced apart over the array and emit the pulses simultaneously.

17. The method according to claim 10, and comprising, after measuring first times of flight in accordance with an initial spatio-temporal sequence, modifying the spatio-temporal sequence and measuring second times of flight in accordance with the modified spatio-temporal sequence.

18. The method according to claim 17, wherein the spatio-temporal sequence is modified so as to measure the second times of flight with a resolution that is finer than the resolution of the first times of flight.

\* \* \* \* \*